United States Patent [19]
Yokoyama et al.

[11] Patent Number: 5,452,102
[45] Date of Patent: Sep. 19, 1995

[54] IMAGE PROCESSING UNIT

[75] Inventors: Yoshihiro Yokoyama, Yokohama; Yasuo Kurosu, Yokosuka; Masaaki Fujinawa, Kanagawa, all of Japan

[73] Assignee: Hitachi, Ltd., Tokyo, Japan

[21] Appl. No.: 213,028

[22] Filed: Mar. 15, 1994

[30] Foreign Application Priority Data

Mar. 15, 1993 [JP] Japan ................... 5-054314

[51] Int. Cl.⁶ ............ H04N 1/41; H04N 1/419; H04N 1/415; G06K 9/42
[52] U.S. Cl. ................... 358/426; 358/432; 358/261.1; 358/261.3; 382/232
[58] Field of Search ........... 358/426, 427, 432, 261.1, 358/261.2, 261.3, 262.1; 382/56, 47, 48

[56] References Cited

U.S. PATENT DOCUMENTS

| | | | |
|---|---|---|---|
| 4,922,545 | 5/1990 | Endoh et al. | 358/426 |
| 5,212,564 | 5/1993 | Yaso et al. | 358/426 |
| 5,274,466 | 12/1993 | Ida et al. | 358/426 |
| 5,291,303 | 3/1994 | Ishikawa | 358/427 |

FOREIGN PATENT DOCUMENTS

| | | |
|---|---|---|
| 59-12368 | 1/1984 | Japan . |
| 59-126368 | 7/1984 | Japan . |

Primary Examiner—Edward L. Coles, Sr.
Assistant Examiner—Kimberly A. Williams
Attorney, Agent, or Firm—Antonelli, Terry, Stout & Kraus

[57] ABSTRACT

An image processing unit relating to a unit for compressing image data, which, in particular, executes an MMR compression scheme which is a standard of facsimile, and improves a data compression ratio while maintaining data exchangeability. The image processing unit includes an image input unit having a function of inputting given image data, an image pattern detector for detecting a predetermined specific image pattern from image data inputted through the image input unit, an image transformation unit for transforming the detected specific image pattern into specific image data in accordance with a predetermined rule, an image compression unit having a function of compressing image data applied with transformation processing in accordance with predetermined steps of procedure, an image decompression unit for decompressing the compressed image data in accordance with predetermined steps of procedure, and a storage unit for storing image data given from the image compression unit or the image decompression unit.

8 Claims, 7 Drawing Sheets

FIG. 3
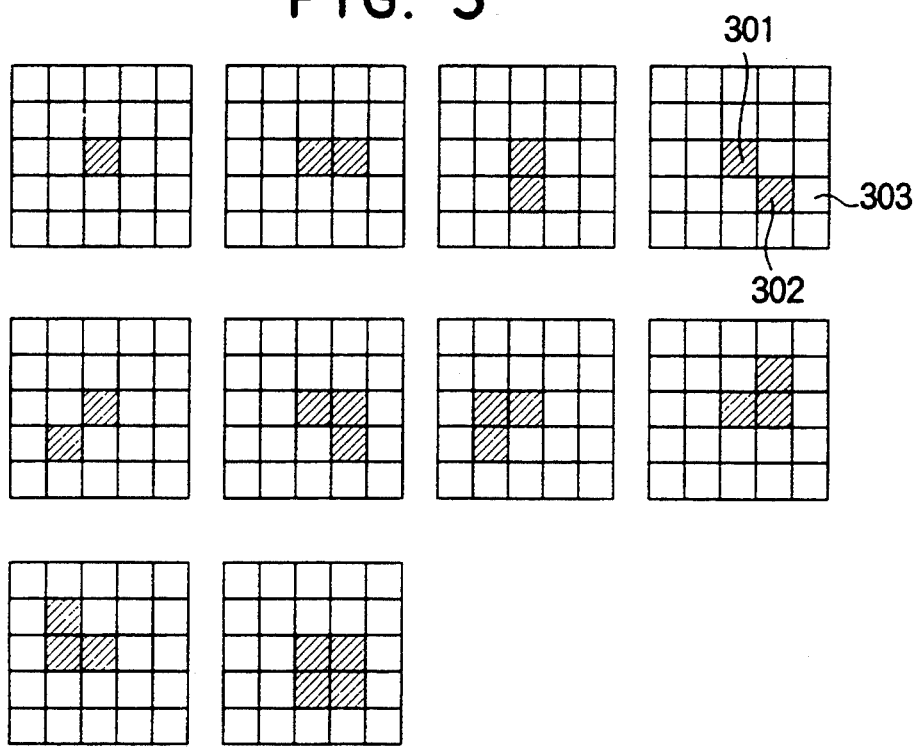
FIG. 4A  FIG. 4B  FIG. 4C  FIG. 4D
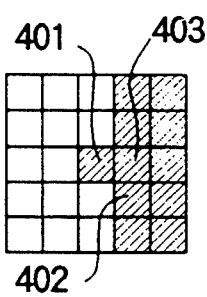 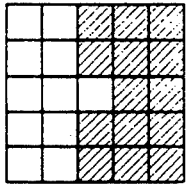 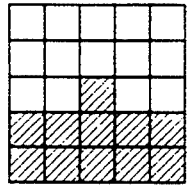 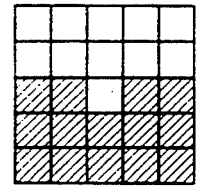
FIG. 5A  FIG. 5B
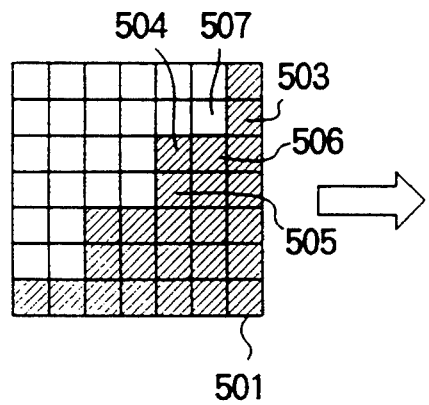 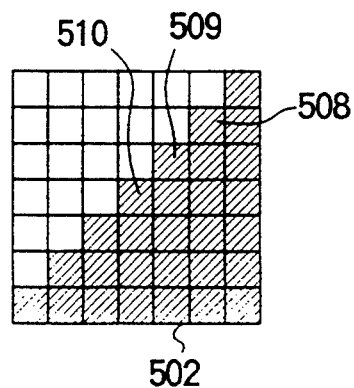

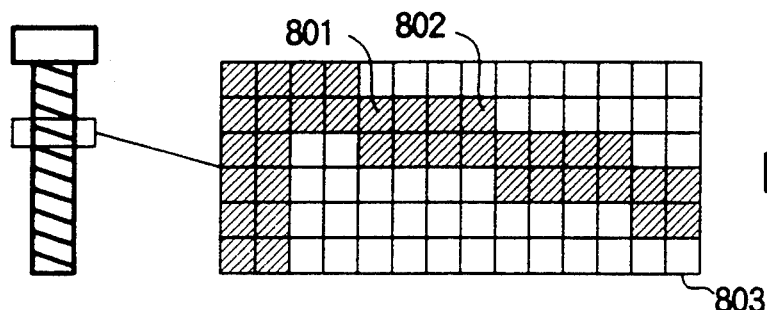
FIG. 8A
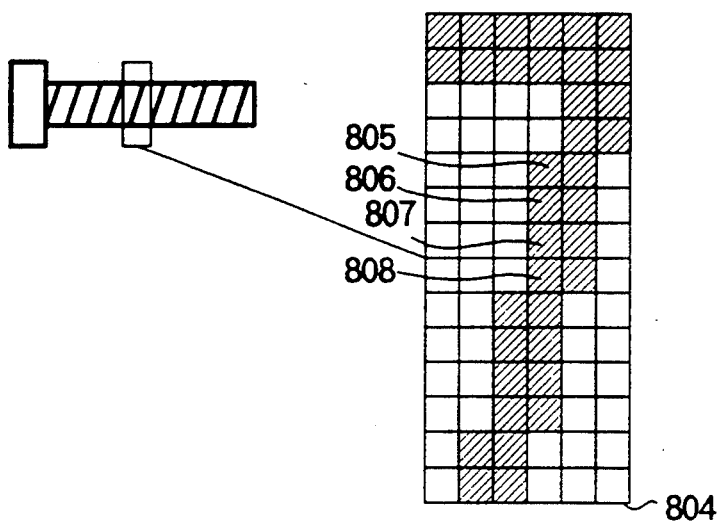
FIG. 8B
FIG. 9A
FIG. 9B
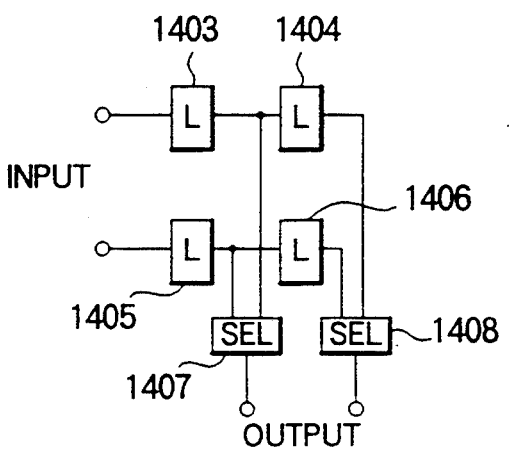
FIG. 9C

FIG. 11A
| INPUT | | | | | | | | | | | | | | | | OUTPUT |
|---|---|---|---|---|---|---|---|---|---|---|---|---|---|---|---|---|
| ... | 2b | 3b | 4b | ... | 2c | 3c | 4c | ... | 2d | 3d | 4d | 5d | ... | 2e | 3e | 4e | 5e | |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| ... | W | W | W | ... | W | B | W | ... | W | B | B | W | ... | W | W | W | W | W |
| ... | W | W | W | ... | W | B | W | ... | W | B | B | W | ... | W | W | W | W | W |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
W : WHITE   B : BLACK
FIG. 11B
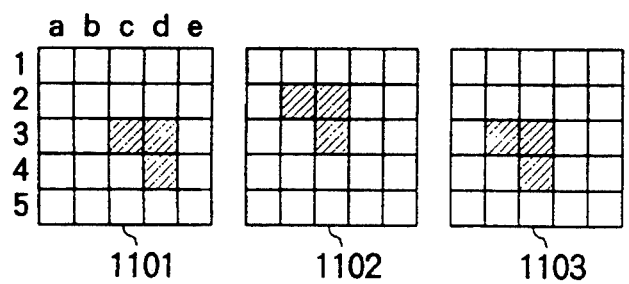
FIG. 12
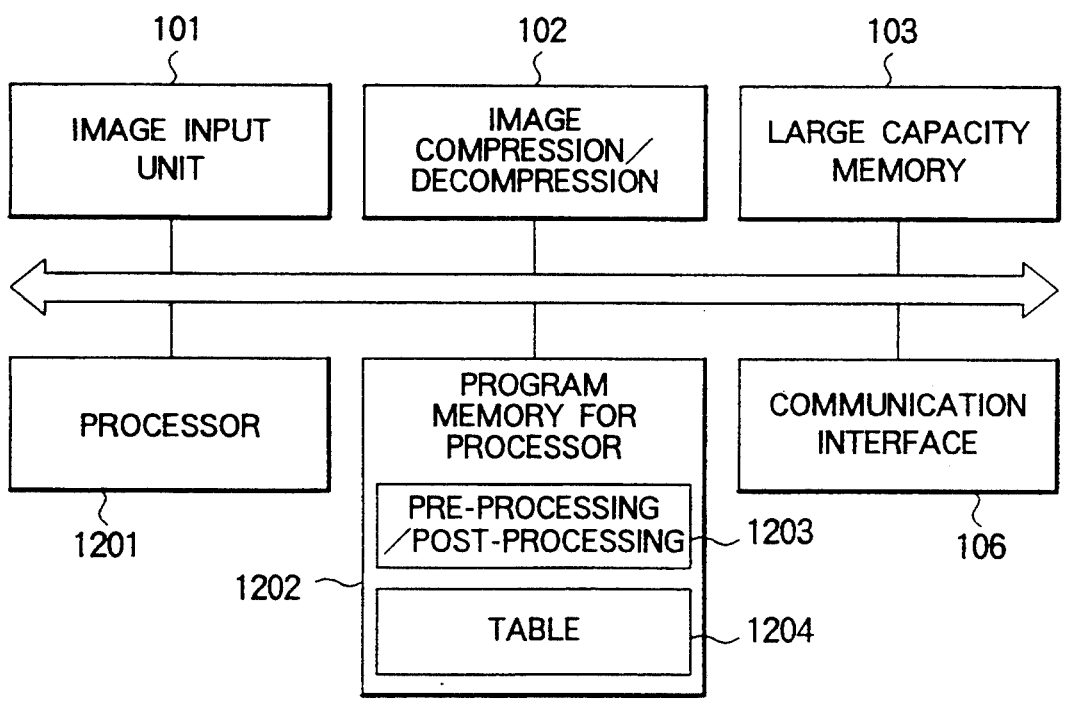

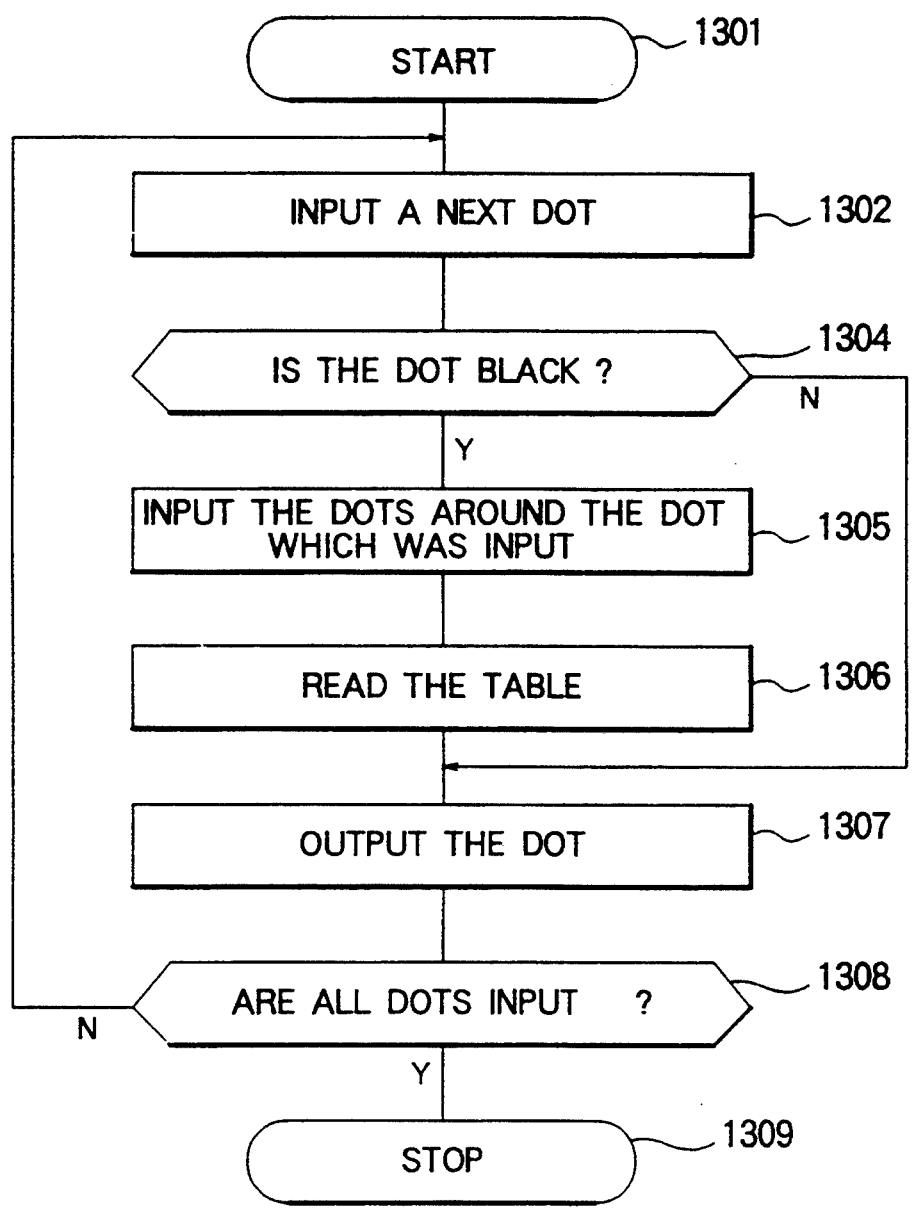

IMAGE PROCESSING UNIT

BACKGROUND OF THE INVENTION

The present invention relates compression/decompression means of an image, and relates to techniques for improving a compression ratio, for example, when an image is compressed by MR coding and MMR coding of Comité Consultatif International Télégraphique et Téléphonique (CCITT) international standard used in an information unit such as a facsimile unit.

Various types of information processing units having an image information processing function in addition to a conventional character code processing function have been widely spread in recent years due to the improvement of computer processing capability, appearance of a large capacity memory and so on.

In office automation, there are various types of equipment such as a facsimile unit, a digital copying machine, a desk top publishing unit and an image filing unit that serve as products applied with image processing techniques. In these types of equipment, even if a large capacity memory appears and a communication medium having high speed data transmitting function is developed, image data is stored after compression processing and transmitted in many cases because the capacity of image data is large. For example, even image data in A4 size having density of 200 Dot Per Inch (DPI) has a data capacity as large as approximately 500 Kbytes, and as for the image data in A3 size having density of 400 DPI, even data capacity of approximately 4 Mbytes is shown. Furthermore, even when 29 lines' worth of 36 characters (36×29=1,044 characters) are written in a full page of A4 size, the character code reaches approximately 2 Kbytes (1,044×2=2,088 bytes assuming one character includes 2 bytes) at most.

Now, as typical compression processing system of an image, there are a Modified Huffman (MH) scheme, a Modified Relative Element Address Designate (MR) scheme, a Modified MR (MMR) scheme and so on of CCITT international standard used in a facsimile unit. As to these schemes and apparatus for realizing the same, detailed description is made in JP-A-59-126368 for instance.

FIG. 2 is a diagram for briefly explaining the MMR scheme having the highest compression ratio among these three types of schemes.

The whole image is scanned horizontally starting from the left upper corner towards the right, data is input dot by dot, and further, horizontal scanning is made from top to bottom, and image data for each scanning line is input successively.

Further, the contents of an image, i.e., black dots (normally referred to also as pixels) exist in such a manner that they are arranged in a form slightly deviating in a horizontal direction and a vertical direction from one another quite frequently. Compression processing is applied to such a list showing slight deviation by assigning short codes.

There are three types of well known methods of compression processing, which are referred to as "horizontal mode", "vertical mode" and "pass mode", respectively.

In the "horizontal mode", the run length of picture elements arranged in a horizontal direction is compressed and coded.

For example, such processing is performed that a binary number "11" having short data length is assigned to two black dots of the highest appearance frequency, and a binary number "000011001010" having long data length is assigned to 26 black dots of low appearance frequency in a manuscript for facsimile of CCITT international standard.

This horizontal mode is required in a portion where no color change occurs and there is no correlation in a vertical direction in the data on a scanning line one line above as shown at the uppermost end of an alphabetic character "A" shown in FIG. 2, and codes are assigned to four white dots from a dot 201 to a dot 202 and to six black dots from a dot 203 to a dot 204.

The "vertical mode" is a coding scheme in which codes are assigned to the deviation quantity of the black picture elements existing in two lines for compression.

Namely, when color change (from white to black, from black to white) occurs in data on a scanning line one line above, and the position where the color change is generated is slightly deviated in the next scanning line, the code is assigned to the deviation quantity. For example, such processing is performed that a binary number "011" is assigned in case of deviation to the right by one dot and a binary number "000010" is assigned in case of deviation to the left by two dots. In the standard, processing the codes corresponding to deviation quantity are specified up to the deviation by three dots to the left and to the right, respectively.

This vertical mode is processing required at an intermediate position of the alphabetic character "A", and a dot 206 is assigned with a code expressing the state that the black picture element is deviated to the left by one dot with respect to a dot 205, and furthermore, a dot 208 is assigned with a code expressing the state that the white picture element is deviated to the left by two dots with respect to a dot 207 as shown in FIG. 2. Being different from the vertical mode, the pass mode encodes the state that continuity of the color change continued from the above line disappears on the scanning line which is an object of compression.

In FIG. 2, since black dots from a dot 209 to a dot 210 disappear in a dot 211 to a dot 212, a code in the pass mode is assigned to a dot 213. This pass mode has an effect of not generating a black dot erroneously in the vicinity of the dot 209 between the dot 211 and the dot 212 by a code in the vertical mode when an image in the vertical mode exists further on the right side of the dot 212.

Such a method of realizing image compression is described in JP-A-59-12368 for instance.

Although an MMR scheme as described above has been proposed as an international standard, the compression ratio is low in similar cases depending on the contents of the image, e.g., when the black dot exists in seclusion. Although it is almost impossible practically, the data quantity is increased to a multiple equal to almost approximately three times the original image data quantity in principle sometimes in the MMR scheme. As a result, various compression schemes, which have not been adopted as the standard, have been proposed.

In proposed various compression schemes, however, a satisfactory compression ratio is unobtainable for all of the images, and furthermore, a problem of data interchangeability is generated since neither of these schemes are standards.

In the MMR scheme among the above-described techniques, the data quantity of an image is compressed by utilizing characteristics of the image, and a mean value of the compression ratios of eight sheets of standard manuscripts for facsimile of CCITT international standard becomes approximately 1/15 times, thus it may be mentioned to be a superior scheme. Further, the scheme has data exchangeability with a plurality of units because of the international standard.

However, the compression data by the MMR scheme still has a large data quantity of approximately 33 Kbytes as compared with a character code in 2 Kbytes. Since image data includes more information such as the form of a character than the character code, it is impossible to compress the data to 2 Kbytes, but it is a matter of course that the compression ratio needs to be improved even if slightly when data transmission, storage or the like is taken into consideration.

In an original compression scheme other than the MR scheme and the MMR scheme, a problem exists in the interchangeability of data. There is such a problem that image data input by spending one's labor cannot be used in the other units.

SUMMARY OF THE INVENTION

It is an object of the present invention to provide an image processing unit in which the compression ratio is improved while following compression procedures of the MR scheme or the MMR scheme.

In order to achieve the object of the present invention by solving the subject described above, the following solving means is proposed. In an image processing unit including an image input means for inputting given image data, an image compression means for compressing the image data in a predetermined procedure, an image decompression means for decompressing compressed image data in accordance with a predetermined procedure, and a storage means for storing given image data, there are further provided image pattern detecting means for detecting a predetermined specific image pattern from the image data input through the image input means and image transforming means for transforming the detected specific image pattern into specific image data in accordance with a predetermined rule, and the image data applied with transformation processing are compressed.

In this case, a common storage portion for storing the predetermined specific image pattern and the predetermined rule and referring to them is provided. It is preferable that the predetermined specific image pattern and the predetermined rule are registered in the common storage portion in a corresponding relationship with each other.

More preferably, an image output means is provided, and the image output means displays image data obtained by decompression processing of the compressed image data by the image decompression means.

Further, in the image processing unit described above, it is possible to input an image at density higher than a predetermined dot density and to alter the density to the predetermined density after transformation processing when the image is input through the image input means.

As described above, according to the present invention, a means for transforming an original image to be compressed so that the compression ratio becomes high is realized when the MR scheme, the MMR scheme or the like is used in accordance with the following inventive aspects.

In first aspect, there are provided a means for detecting an unnecessary partial image in an original image or noise out of the original image data, means for removing the detected noise out of the original image data and means for compressing image data with the noise removed.

In a second aspect, there are provided input means for inputting original image data through a scanner device or the like by a user at density higher than the required density, means for detecting an unnecessary partial image in the original image or noise out of the original image data, means for removing the detected noise out of the original image data, means for converting the image data with the noise removed so as to show necessary density and means for compressing the image data with the density of the converted data.

In third aspect, there are provided a means for detecting a kern and a recess or a "notch" of an unnecessary black dot in the original image out of the original image data, means for removing the detected notch out of the original image data by smoothing the detected notch and means for compressing the image data with the notch removed.

In a fourth aspect, there are provided a means for detecting a step of two black dots or more in a vertical direction and three black dots or more in a horizontal direction in the original image out of the original image data, means for transforming the original image data from the detected step of two black dots or more to step of one black dot, and a means for compressing the transformed image data.

In fifth aspect, there are provided a means for detecting a step of one black dot in a vertical direction and four black dots or more in a horizontal direction in the original image out of the original image data, means for transforming the original image data from the detected step of one black dot to a step of two black dots and means for compressing the transformed image data.

In sixth aspect, there are provided a means for detecting a step of one black dot in a vertical direction and four black dots or more in a horizontal direction in an original image out of the original image data, means for transforming the original image data from the detected step of one black dot to a step of two black dots, means for compressing the transformed image data, means for decompressing the compressed image data, means for detecting a step of two black dots in the decompressed image data and means for transforming the detected step of two black dots to a step of one black dot.

In seventh aspect, there are provided a means for detecting a step of three black dots or more in a horizontal direction of an original image, means for determining whether the original image is rotated 90 degrees or not based on the number of the detected steps, means for rotating the original image 90 degrees, means for compressing the rotated image data, means for decompressing the compressed image data and means for rotating the decompressed image data 90 degrees in an opposite direction to the first 90 degree rotation.

In an eighth aspect, there are provided means for rotating the original image 90 degrees, first compression means for compressing the original image before rotation, second compression means for compressing the image data after rotation, means for comparing a compressed data quantity by the first compression means with a compressed data quantity by the second compression means, means for selecting compressed data having a small data quantity based on the result of the comparison and means for decompressing the compressed data of the image data rotated by 90 degrees when the compressed data of the image data rotated by 90 degrees are selected, and for rotating the decompressed image data in an opposite direction to the 90 degree rotation.

Concrete operation of the above-mentioned means will be described.

First, when an unnecessary partial image (which means an image composed of black dots partially existing in an image) exists in an image, a compression code is also assigned to the partial image in a conventional compression method. Hence, the compression ratio is lowered.

For example, when image data is input from a scanner device, small black dots are generated in a white portion of an image even under normal conditions. Further, small white dots are generated in a black portion of an image conversely. This phenomenon occurs more frequently as a ground color of a manuscript input through a scanner device gets thicker, and occurs frequently particularly in reference to a diazo copy. Such a partial image presents image data that is unnecessary to show the contents of the image, i.e., the noise.

FIG. 3 shows ten types of pattern examples of noises generated frequently when image data are input through a scanner device.

First, various types of partial images such as those shown in FIG. 3 are detected by means for detecting an unnecessary partial image or noise in an original image out of the original image data.

Here, attention is given to isolated one to four black dots in the white image and isolated one to four white dots in the black image (not illustrated in FIG. 3) as a noise pattern. Next, a black dot existing in seclusion in the white image is converted into a white dot and a white dot existing in seclusion in the black image is converted into a black dot by a means for removing the detected noise out of the original image data. The image data applied with such conversion processing to thereby remove the noise is processed for compression by the means for compressing the image data. Thus, although a compression signal for a dot 301 cannot be shown accurately since it changes depending on the image state on the right side of the dot 301 on the same scanning line, the compression code for a dot 302 and a dot 303 shows a binary number "011011" by the rule of the MMR scheme. Thus, it is possible to reduce six bits of the compression data.

Furthermore, when a noise such as that shown in FIG. 3 is detected, read density of a scanner device is increased and the sizes of punctuation marks or the like required originally are enlarged to be input in order to distinguish punctuation marks, quotation marks or the like from noises. Further, as the feature of an image input through a scanner device, a kern and a recess or a notch of a black dot are generated when a straight line or the like is input. This fact is comprehended from a phenomenon that, for example, when an input object in the scanner device is located at a boundary position between a black dot and a white dot on a manuscript, color information of the dot becomes unstable (namely, the dot can be either a white dot or a black dot) due to the relationship with resolution of the scanner device. Such a notch deteriorates the quality of the original image and also causes lowering of the compression ratio, which therefore is undesirable.

FIGS. 4A to 4D show typical patterns of notches that are frequently generated when an image is input through a scanner device.

First, partial images such as those shown in FIGS. 4A to 4D are detected by means for detecting unnecessary kern and recess or a notch of a black dot in an original image out of original image data. Normally, either a kern or recess state of one dot at the boundary between black and white in a horizontal direction or a vertical direction is presented as shown in FIGS. 4A to 4D.

Next, a black dot projecting one dot only is converted into a white dot and a white dot projecting one dot only is converted into black dot by means for smoothing the detected notch so as to remove it out of the original image data. The image data applied with such conversion processing are compressed by a means for compressing image data. Through this processing, a dot 401 is converted into a white dot, and a binary number "1" is assigned to a dot 403 and a binary number "1" is assigned to a dot 402 in lieu of assigning a binary number "010" to the dot 401 and a binary number "011" to the dot 402. Thus, it is possible to reduce compressed data from "6" bits in total to "2" bits in total.

A notch is generated at the boundary between a black dot and a white dot forming a horizontal line or a vertical line, but such steps as shown in FIG. 5A are sometimes produced along an oblique line. It is possible to aim at improvement of the compression ratio by smoothing the steps of an image 501 shown in FIG. 5A so as to convert it into the image such as an image 502 shown in FIG. 5B.

First, an image such as the image 501 is detected by using means for detecting a step of two or more black dots in a vertical direction and three or more black dots in a horizontal direction in the original image out of the original image data. In the above description, the "step" of two or more black dots in a vertical direction shows positions of a black dot 504 and a black dot 505 which are adjacent to white dots and continuous in the vertical direction in the image 501, and shows a step of two dots in this case. When the step in the vertical direction is one dot, the step becomes as shown in FIG. 5B and does not transform the image.

Further, the "step" of three or less black dots in a horizontal direction shows positions of a black dot 506 and a black dot 504 for instance which are adjacent to white dots and continuous in the horizontal direction in the image 501, and shows a step of two dots in this case.

In the MMR scheme, since compression processing cannot be performed with a code of the vertical mode when the step in the horizontal direction includes four dots or more, the compression ratio is improved by using new processing means and a scheme which will be described next.

Next, the detected step of two black dots or more is processed so as to convert a dot 507 into a black dot 508 by a means for transforming original image data to a step of one black dot, to thereby convert the image 501 into the image 502. The image data applied with such conversion processing is compressed by compression means. With this, since a binary number "010" is assigned to a dot 509 and a binary number "010" is also assigned to a dot 510 in lieu of assigning a binary number "000010" to the dot 504 and a binary number "1" to the dot 505, it is possible to reduce the compressed data from "7" bits in total to "6" bits in total.

When the steps in the horizontal direction are four or more along an oblique line shown in FIG. 6A, it is possible to improve the compression ratio by transforming an image 601 to an image 602 shown in FIG. 6B.

First, an image such as the image 601 is detected using means for detecting a step of one black dot in the vertical direction and four black dots or more in the horizontal direction in the original image out of the original image data.

Namely, an image including a step of one dot in the vertical direction as a dot 602 and four steps or more in the horizontal direction as from a dot 603 to a dot 604 becomes an object for detection.

Next, the black dots from the dot 603 to the dot 604 are converted into white dots from a dot 605 to a dot 606 by a means for transforming the original image data from the detected step of one black dot to a step of two black dots, to thereby transform an image 601 to an image 602. The transformed image data is compressed by compression means.

With this, although a compression code for the dot 604 cannot be shown accurately since it becomes horizontal mode codes according to the number of white dots on the left of the dot 604, one bit of a binary number "1" is assigned to a dot 607. Hence, it is possible to reduce compressed data for certain.

Furthermore, when the image 601 is converted into the image 602, the picture quality is deteriorated in general. Therefore, when an image obtained by decompressing the compression code is displayed, printed or so on, a step of two dots in a vertical direction, a dot 607 and a dot 608, is detected, and the dots in the horizontal direction from the dot 605 to the dot 606 are converted into black dots.

Since there is no means for specifying a transformed portion at time of compression, however, the image is not returned to an original image completely because the transformation processing is also applied to portions other than those that are transformed at the time of compression. Further, the method described above is applied to the boundary portion between white and black areas in FIGS. 6A and 6B, but it is needless to say that this method is applicable to a white line, a black line or the like having a certain width.

FIGS. 7A to 7E show examples of transformation processing of a black line.

Black dots from a dot 706 to a dot 707 shown in FIG. 7A are converted into white dots from a dot 708 to a dot 709, and a dot 712 to a dot 713 adjacent to the underside of the dot 708 to the dot 709 are converted into black dots (FIG. 7B).

Furthermore, a dot 710 and a dot 711 adjacent to the right side and the right underside of the dot 708 are converted into black dots (FIG. 7B). Besides, the image 602 shown in FIG. 6B is also obtainable by applying this conversion procedure to the image 601 shown in FIG. 6A. With this, when an image 701 shown in FIG. 7A is transformed, an image 702 is obtained as shown in FIG. 7B, thus making it possible to improve the compression ratio.

Although the density of an image is lowered in a pseudo manner in the above-mentioned method, but since information quantity is large being different from an image having low density originally, there is no problem in a reproduced image at the time of decompression.

Further, in the case of an image expressing two black lines where a white dot and a black dot are in existence at every dot in a vertical direction as an image 703 shown in FIG. 7C, the configuration is changed as an image 704 shown in FIG. 7D when transformation processing is performed, but two black lines are maintained to exist.

However, since it is impossible to distinguish a white dot from a black dot with respect to every dot in an image having low density originally, one black line is presented as an image 705 shown in FIG. 7E.

Compression is made in MMR encoding by utilizing lists of black dots in the horizontal direction and the vertical direction of the image, but processing is not necessarily applied equally in the horizontal direction and the vertical direction. As a result, when an original image and an image obtained by rotating the original image 90 degrees are compressed, the data quantity becomes different. Namely, compression codes are assigned only by the width of the step of upper and lower zero dot since the image is looked at only in one scanning line unit in the horizontal list of black dots, but the compression ratio is improved sometimes when rotated by 90 degrees due to the width of steps in the horizontal direction and the vertical direction since the compression code is assigned to the width of the step of six dots in total on the left and the right in the list of black dots in the vertical direction.

Now, FIGS. 8A and 8B illustrate a case that a screw having a screw thread which is an input image object shown on the left side of FIG. 8A is arranged being set on edge perpendicularly (image data on the right side of FIG. 8A being shown at 803) and a case that the screw thread on the left side of FIG. 8B is arranged being rotated by 90 degrees from the left side of FIG. 8A (image data on the right side of FIG. 8B being shown at 804).

First, a step from a dot 801 to a dot 802 in FIG. 8A is detected by means for detecting a step of three black dots or more in a horizontal direction of the original image of the illustrated screw thread. It is determined to rotate 90 degrees when the number of steps is predetermined number or more by a means for determining whether to rotate the original image by 90 degrees or not depending on the number of detected steps with respect to these detection points.

In case of rotation by 90 degrees in such a manner, the image 803 is rotated by 90 degrees to the image 804 by means for rotating the original image by 90 degrees (FIG. 8B).

Next, compression processing is performed by means for compressing rotated image data.

With this, since there are steps in four dots in a horizontal direction in the image 803, a code in the horizontal mode is assigned. Whereas, a vertical mode is presented in the image 804, and a binary number "010" is assigned to a dot 805 and a binary number "1" is assigned to a dot 806, a dot 807 and a dot 808, respectively, thus making it possible to reduce the data quantity. Furthermore, decompression is made to the image 804 by means for decompressing the compressed image data, and the image 804 is processed so as to be rotated to the image 803 by means for rotating the decompressed image data 90 degrees in a direction opposite to the 90 degree rotation, thus obtaining the original image.

It has been determined whether to rotate 90 degrees in the above-mentioned means using the reference of a step of three black dots or more in a horizontal direction, but it is desirable that the data quantities are compared by practically compressing an original image and an image obtained by 90 degree rotation of the original image, and smaller data quantity is selected.

As described above, it is possible to improve the compression ratio by transforming the original image to be compressed while following compression procedures of the MMR scheme having data exchangeability.

BRIEF DESCRIPTION OF THE DRAWINGS

The present invention will be more apparent from the following detailed description, when taken in conjunction with the accompanying drawings, in which:

FIG. 3 shows diagrams showing pattern examples of noises in an image;

FIGS. 4A to 4D are diagrams showing pattern examples of notches in the image;

FIGS. 5A and 5B are explanatory diagrams for explaining smoothing of an image;

FIGS. 8A and 8B are explanatory diagrams for explaining improvement of a compression ratio by rotational processing of an image;

FIGS. 9A and 9B are explanatory diagrams for explaining 90 degree rotational processing;

FIG. 9C is a circuit diagram showing an embodiment thereof;

FIG. 11A is an image processing table according to the present embodiment;

FIG. 11B shows a pattern example of removing noise in an image;

FIG. 12 shows a structural example of an image compression/decompression system; and FIG. 13 is a flow chart of a pre-processing program.

DESCRIPTION OF THE PREFERRED EMBODIMENTS

Embodiments of the present invention will be described hereinafter with reference to the drawings.

Figure 1:
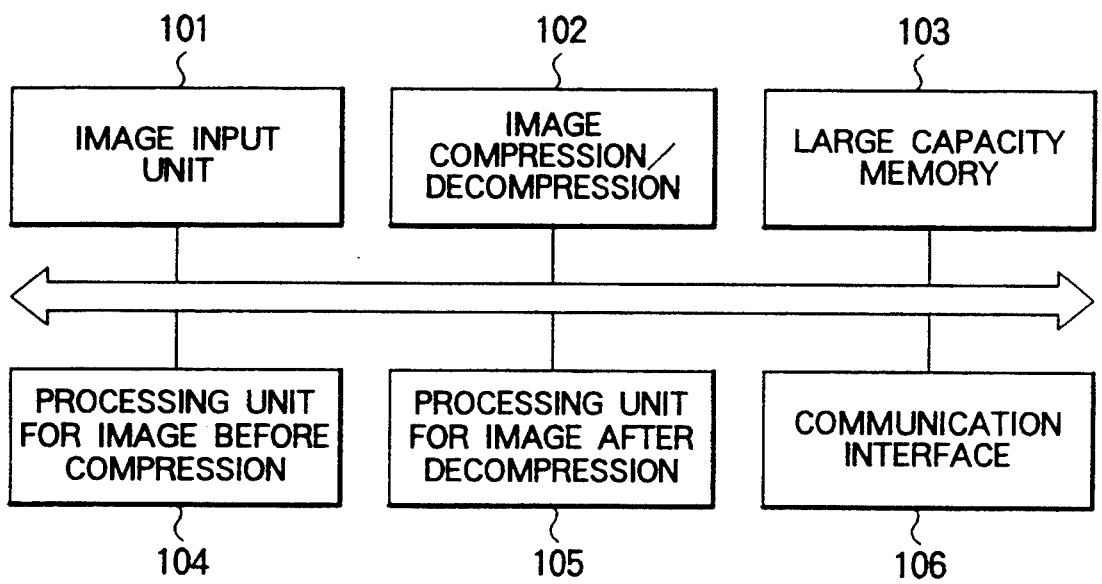
FIG. 1 is a block diagram of an image compression/decompression system according to an embodiment of the present invention.
Figure 2:
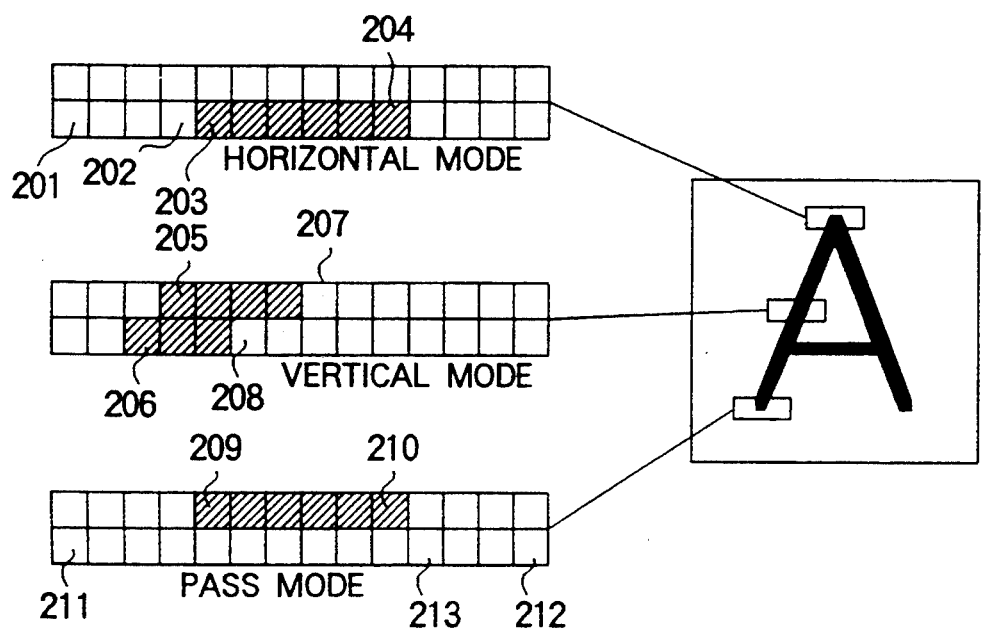
FIG. 2 is an explanatory diagram showing a method of compressing a facsimile image.
Figure 6A:
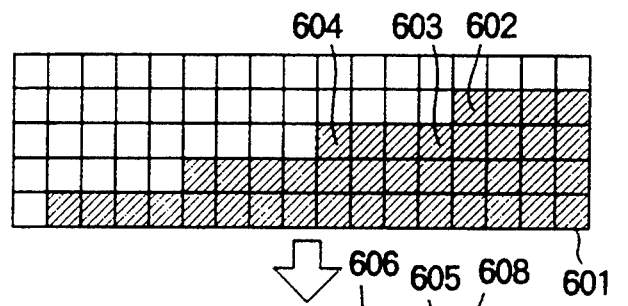
FIGS. 6A and 6B are explanatory diagrams for explaining improvement of a compression ratio by transformation processing of a black area of an image.
Figure 6B:
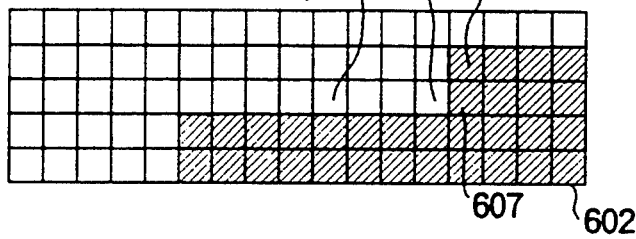
Figure 7A:
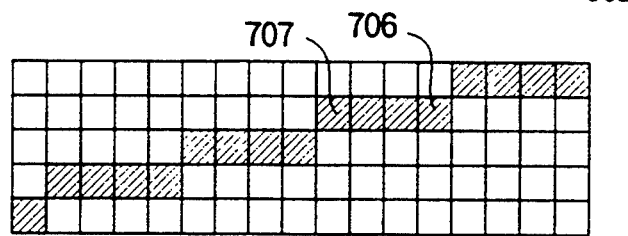
FIGS. 7A to 7E are explanatory diagrams for explaining improvement of a compression ratio by transformation processing of an image line.
Figure 7B:
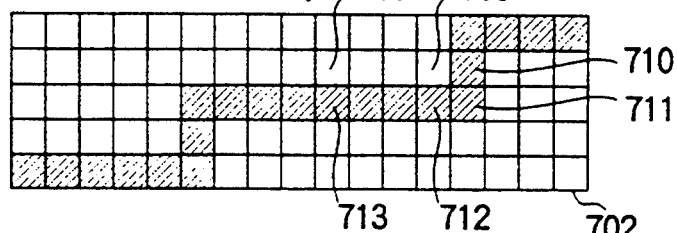
Figure 7C:
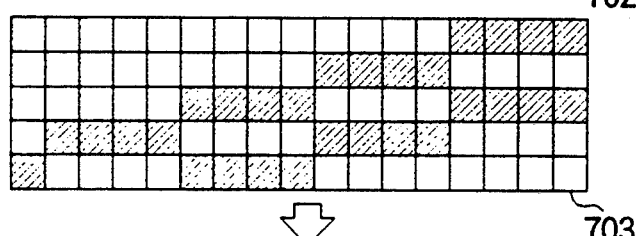
Figure 7D:
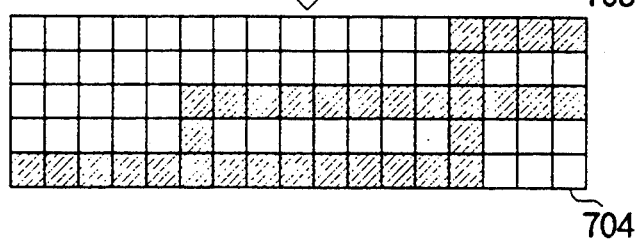
Figure 7E:
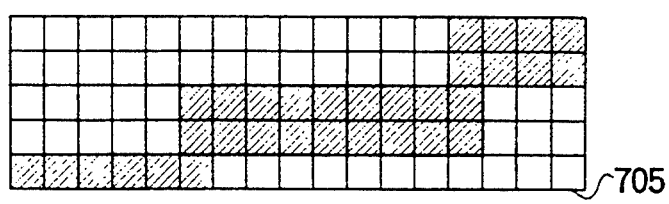

FIG. 1 shows a structural example of an image compression/decompression system.

An image compression/decompression system according to the present embodiment includes an image input unit 101, an image compression/decompression unit 102, a large capacity memory 103, a processing unit for image before compression 104, a processing unit for image after decompression 105 and a communication interface 106.

Components will be described hereunder.

The image input unit 101 is a means for reading a paper manuscript optically and converting given image information into image data of electric signals, and can be realized by a scanner device for instance. Besides, the image data converted into electric signals are transmitted to the processing unit for image before compression 104. The image compression/decompression unit 102 is a means for receiving image data from the processing unit for image before compression 104, performs compression processing in accordance with processing procedures of an MMR scheme and transmitting compressed data to the large capacity memory 103 or the communication interface 106, and can be realized with various types of CMOSs (Complementary Metal Oxide Semiconductor) or the like for instance.

Further, the image compression/decompression unit 102 is also a means for receiving compressed data from the large capacity memory 103 or the communication interface 106, decompressing the data in accordance with processing procedures of the MMR scheme and transmitting the decompressed image data to the processing unit for image after decompression 105.

The large capacity memory 103 is, for example, a means for receiving a large amount of compressed data from the image compression/decompression unit 102 and storing those data, and a means having a storage capacity of giga-byte order can be realized with an optical disk storage unit, a disk array storage unit or the like for instance.

The processing unit for image before compression 104 is a means for performing transformation processing of a given original image. It receives image data from the image input unit 101 and transmits the image data after transformation processing to the image compression/decompression unit 102. The details of processing will be described later. The present system can be realized by, for example, various types of CMOSs or the like.

Figure 10:
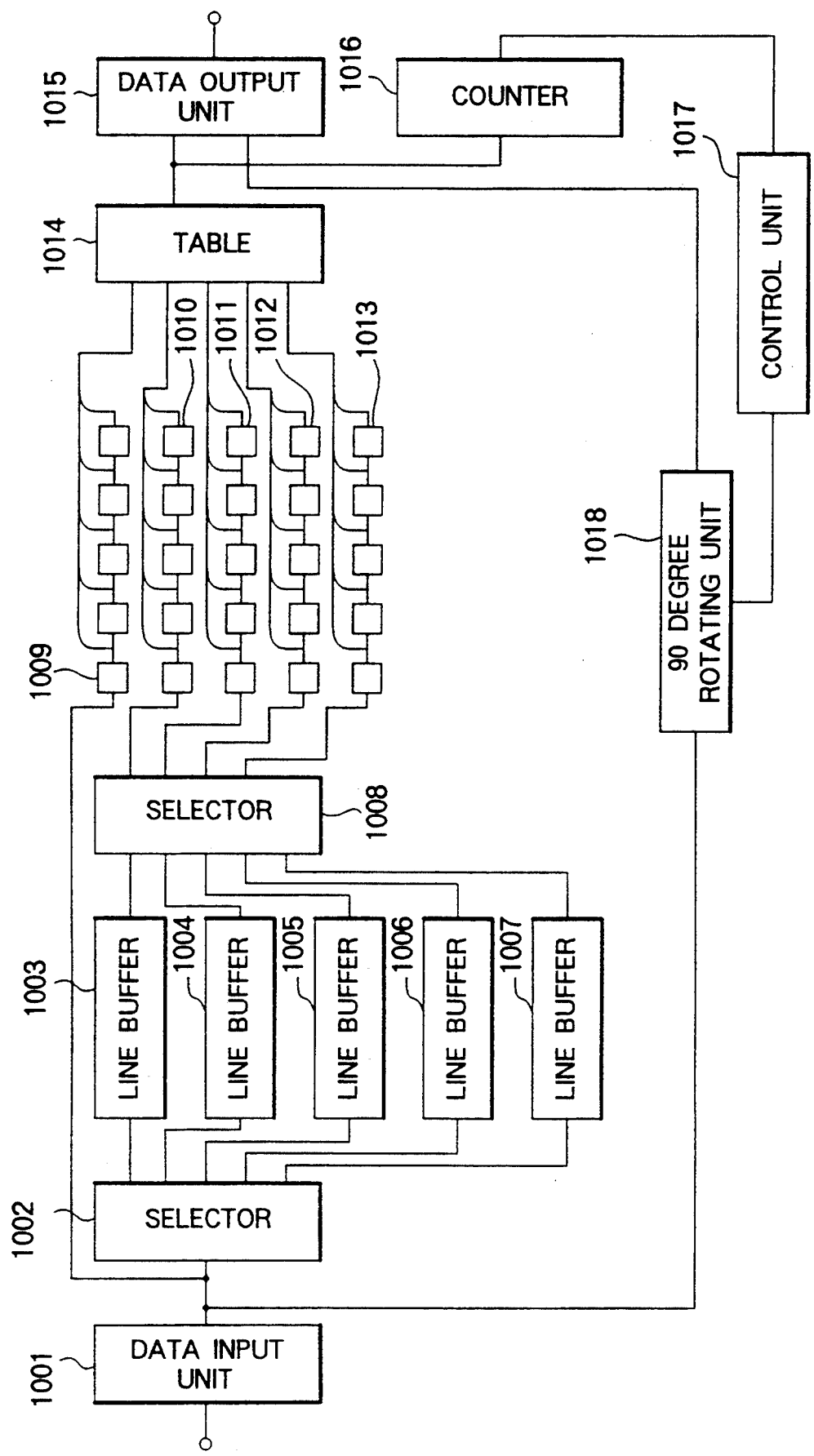
FIG. 10 shows a structural example of a compression pre-processing device.

The processing unit for image after decompression 105 is a means for applying correction processing so as to have an image applied with transformation processing come close to the original image, which receives image data from the image compression/decompression unit 102 and transmits those data to an output unit 1015 (see FIG. 10). The present system can be realized with electronic devices such as CPU, ROM, RAM, various CMOSs or the like.

The output unit 1015 performs display, printing and so on of the transmitted image data. The present system can be realized with, for example, a printing means such as a printer or a display means such as CRT, EL display and liquid crystal display.

The communication interface 106 is a means for receiving compressed data from the image compression/decompression unit 102 and transmitting the data to another system or for receiving compressed data transmitted from another system and transmitting the data to the image compression/decompression unit 102, and can be realized with electronic devices such as CPU, ROM, RAM and various CMOSs.

A basic flow of image data in the present system will be described hereinafter.

First, the image data input through the image input unit 101 is applied with transformation processing in the processing unit for image before compression 104.

Next, the data applied with transformation processing is applied with compression processing to an MMR code by means of the image compression/decompression unit 102. The data applied with compression processing is either stored in the large capacity memory 103 or transmitted to another system by means of the communication interface 106.

A reverse data flow is also conceivable. Namely, the compressed data stored in the large capacity memory 103 or the compressed data transmitted from another system which is received by the communication interface 106 is applied with decompression processing to show the image data by means of the image compression/decompression unit 102 and applied with transformation processing by means of the processing unit for image after decompression 105, thus making it also possible to display or print the processed data by the output device 1015.

Now, an example of a block diagram of the processing unit for image before compression 104 is shown in FIG. 10.

The present system is composed of a data input unit 1001, a selector 1002, line BUFs (BUF means a buffer) 1003 to 1007, a selector 1008, a table 1014, a 90 degree rotating unit 1018, a control unit 1017, a counter 1016, shift registers 1009, 1010, 1011, 1012 and 1013 and a data output unit 1015.

Further, respective components can be realized with, for example, CPU, ROM, RAM, various CMOSs or the like.

There are the following five types of processings as described previously as concrete processing contents of the processing unit for image before compression 104. Those are:

firstly, "detection and removal of noises", secondly, "detection and removal of notches", thirdly, "detection of a step of two black dots or more in a vertical direction and three black dots or less in a horizontal direction and transformation of the detected step to a step of one black dot", fourthly, "detection of a step of one black dot in a vertical direction and four black dots or more in a horizontal direction and transformation of the detected step to a step of two black dots", and fifthly, "detection of a step of three dots or more in a horizontal direction and determination as to whether to rotate 90 degrees based on the number of detected steps and further 90 degree rotational processing".

Since processing is performed by investigating the color of dots existing within a predetermined range and detecting a pattern of a partial image in any processing, it is sufficient to adopt a technique of determining image data after processing by referring to a table in which the processing result is determined with respect to various cases in advance from the color information of the dots existing in the predetermined range.

Now, the operation of the present system will be described.

The data input unit 1001 is a means for receiving the image data obtained through the image input unit 101. Since the pattern of a partial image is detected by referring to five scanning lines at a time in the present embodiment, the image data in the scanning line unit is stored using the line BUFs 1003, 1004, 1005, 1006 and 1007 in order to hold the image data input from the data input unit 1001 until four scanning lines' worth of data following to a certain scanning line are input.

This processing is performed practically in the manner described as follows.

First, the selector 1002 selects the line BUF 1003, and the image data is written in the selected line BUF 1003.

Next, the selector 1008 selects line BUFs 1004, 1005, 1006 and 1007 in consecutive order and reads four scanning lines' worth of rewritten image data, respectively, existing above. The image data output by the data input unit 1001 to the selector 1002 is not only written into the line BUF 1003 through the selector 1002, but also transmitted to the shift register 1009.

In data input of the next scanning line, the selector 1002 selects the line BUF 1004 and writes the image data, and the selector 1008 selects the line BUFs 1003, 1005, 1006 and 1007 and reads four scanning lines' worth of image data existing above.

With this, for example, the data of the first to the fourth scanning lines are stored in the line BUFs 1004 to 1007, the data of the sixth scanning line are written while erasing the image data of the first scanning line existing in the line BUF 1004 after storing the data of the fifth scanning line in the line BUF 1003, and the data of the second to the sixth scanning lines are stored.

Accordingly, five vertically adjacent scanning lines' worth of image data always become complete in the shift registers 1009, 1010, 1011, 1012 and 1013.

The shift registers 1009 to 1013 are realized by a structure in which a plurality of flip-flops are connected in series, and, since one set of flip-flop stores the color of one dot, it is possible to fetch image data of five dots each in the horizontal and vertical directions, respectively, by providing the shift registers 1009 to 1013 (as referable to the drawings, each shift register is structured including five sets of flip-flops).

These fetched data of "5×5 dots" or 25 dots in total are input to the image processing table 1014 so as to determine the image data after transformation processing, and the image data are transmitted to the image compression/decompression unit 102 from the data output unit 1015. Here, the contents of the table 1014 are shown in FIG. 11A.

The storage area in "5×5 dots" which is the storage area of the shift registers 1009 to 1013 is expressed with a matrix having "rows" 1 to 5 and "columns" a to e.

In the matrix, the matrix element "3,c" is the center, and the contents of the dot of the center "3,c" are adopted as "output" with reference to the range of 5×5 dots.

As an example, the case wherein a noise of three black dots is detected and removed will be shown.

As a pattern of a noise of three black dots, three types of images 1101, 1102 and 1103 such as shown in FIG. 11B and images obtained by rotating these images 90 degrees, 180 degrees and 270 degrees are conceivable. The difference among noise patterns of the images 1101, 1102 and 1103 is such that to which position of three black dots forming the partial image the dot of the matrix element "3,c" which is the center element corresponds, and all of these three dots have to be arranged to be output as white dots when determination is made by referring to the table 1014 in order to remove the noise of three black dots.

The table contents 1104 shows the relationship in case colors to be output when the data in 25 dots are supplied as input signals are adopted as output signals.

In this table, 2b to 5e entered in input items correspond to 2b to 5e of the image 1101 for instance, and the "output" of the table shows the color after processing of the dot existing at the position of the matrix element "3,c" which is the center.

An item 1105 expresses the state of the image 1101.

Namely, only matrix elements "3,c", "3,d" and "4,d" are black dots, and those elements around these black dots are white dots. The output in this case shows a white dot, and it is possible to remove the noise by utilizing this output.

Furthermore, an item 1106 shows an example that the matrix element "5,e" of the image 1101 is also a black dot, and since this pattern is not a noise, "black" which is a color of a dot existing at the position of the matrix element "3,c" which is the center of 25 dots is output.

An example of detecting a noise of three black dots and removing it has been shown in the example of FIG. 11, but it becomes possible to remove all of the noises shown in FIG. 3 with patterns by altering the table contents 1104 appropriately.

Further, it becomes possible to detect and remove notches shown in FIGS. 4A to 4D based on the table contents 1104 by a way of thinking similar to the noise removal processing described above.

For example, since it is sufficient to generate a pattern for converting a dot 401 into a white dot for cases shown in FIGS. 4A to 4D, it may be arranged so that "white" is output when the color of the dots existing in the matrix element "3,c", the column d and the column e is "black".

Furthermore, processings in FIGS. 5A and 5B and FIGS. 6A and 6B also become possible by forming a structure in which the number of the shift registers 1009 to 1013 is increased and by altering the contents of the table 1014 taking the number of input signals corresponding to such increase into consideration.

As to the determination of whether or not 90 degree rotation processing is to be performed and 90 degree rotation processing based on detection of a step of three black dots or more in a horizontal direction and the number of detected steps, the number of places where a step of three black dots or more in a horizontal direction exists is counted by the counter 1016 utilizing pattern matching by the table 1014 described above, and it is determined by the controller 1017 whether the number of places is a predetermined number or more. When the number of places is a predetermined number or more, 90 degree rotation processing is performed by the 90 degree rotating unit 1018. A means for realizing 90 degree rotation is described in detail in JP-A-59-60490, but it will be described to some extent here.

FIGS. 9A to 9C are diagrams for explaining means for realizing 90 degree rotation.

In a method of rotating an image 1401 90 degrees, a given image is divided into images in 16×16 dots for instance, i.e., A1 to D3 as shown in FIG. 9A, and the layout of the images A1 to D3 of 16×16 dots is altered as shown with an image 1402 in FIG. 9B. Namely, the image A1 located at the upper left of the image 1401 in FIG. 9A is moved to the upper right of the image 1402. Here, the reason why the image is divided into images in the unit of 16×16 dots is that there are many storage units capable of normally reading/writing 16 dots collectively in the horizontal direction. In such a storage unit, it is possible to realize layout change from the image 1401 to the image 1402 with simple movement processing.

Now, even when the image 1401 is converted into the image 1402, it is still required to apply rotational processing to the image in 16×16 dots.

In order to realize the above, as shown in FIG. 9C for instance, a circuit in which the contents of two dots in a horizontal direction are stored in a latch 1403 and a latch 1405, wherein the contents of two dots stored in the latch 1403 and the latch 1405 are then shifted to a latch 1404 and a latch 1406, two dots in a horizontal direction adjacent to the underside of two dots input previously are stored in the latches 1403 and 1405, the contents of the latches 1403 and 1404 are output as two dots in the horizontal direction by select functions of a selector 1407 and a selector 1408, and furthermore the contents of the latches 1405 and 1406 are output as two dots in the horizontal direction, is used. This circuit is an example of rotating 2×2 dots, but rotational processing of 16×16 dots can be performed by a similar circuit.

The structure and the operation of the processing unit for image before compression 104 have been described above, but, since the processing unit for image after decompression 105 is also a means for performing pattern matching processing and transformation processing of an image basically, it can be realized with the same structure as that shown in FIG. 10, and it is sufficient only to alter the contents of the table 1014 to desired contents.

As described above, according to the present invention, such an effect is produced that it is possible to apply transformation processing to an input image with a simple structure and to improve the compression ratio of image data while conforming to compression procedures of the MMR scheme.

Another embodiment of the present invention will be described hereinafter with reference to FIG. 12.

FIG. 12 also shows a structural example of an image compression/decompression system.

The present system is composed of an image input unit 101, a compression/decompression system 102, a large capacity memory 103, a processor 1201, a program memory for processor 1202 and a communication interface 106. In the structural example shown in FIG. 12, the method of realizing the processing unit for image before compression 104 and the processing unit for image after decompression 105 which are components in FIG. 1 is different. In the present structure, a structure having the same function is realized by means of the general purpose processor 1201 and a program stored in the program memory for processor 1202.

The processor 1201 is provided with several units of registers and can be structured of a general purpose processor capable of executing arithmetic operation, logical operation or the like. For example, it is sufficient to use a processor such as H8 and H16 manufactured by Hitachi, Ltd.

The processor 1201 applies transformation processing to image data as compression processing (which is executed by a program for "pre-processing" stored in 1203) for the image data input through the image input unit 101 in accordance with the program stored in the program memory for processor 1202, and sends the transformed image data to the image compression/decompression unit 102, and applies transformation processing to the image data which are sent from the image compression/decompression unit 102 as decompression after-processing (which is executed by a program for "after-processing" stored in 1203). Besides, the program memory for processor 1202 is realized by a semiconductor memory composed of a RAM or the like for instance, and stores a program 1203 and a table 1204 for pre-processing and after-processing in advance.

An example of a flow chart of compression preprocessing in the program 1203 is shown in FIG. 13. Further, the contents of the table 1204 are the same as the table contents 1104 described previously.

Further, the processor 1201 reads instructions written in the program 1203 in consecutive order and proceeds with processing.

Now, compression pre-processing will be described in detail with reference to FIG. 13.

The content itself of this processing is the same as the processing performed in the structural example shown in FIG. 10.

First, processing is started at step 1301.

In step 1302, the image data are input dot by dot into the processor 1201 through the image input unit 101 and stored in the register in the processor 1201.

Next, in step 1304, it is determined whether or the dots stored in the register are black dots.

In the case of a white dot, it is not required to convert the white dot into a black dot in the whole compression pre-processing including noise removal. Therefore, the process is branched to a step 1307 with the white dot as it is, and the data is output to the image compression/decompression unit 102 in step 1307.

In the case of a black dot, the process is proceeded to step 1305.

In the step 1305, image data around one dot input in the step 1302 are input.

When noise removal processing is performed, if it is assumed that the dot corresponding to the matrix element "3,c" shown in FIG. 11 is input in the step 1302, 5×5 dots from a matrix element "1,a" to a matrix element "5,e" are input and stored in the register of the processor 1201.

In the processing of steps shown in FIG. 5 to FIG. 7, image data related to peripheral dots in a wider range are input. The color of a dot to be output is determined corresponding to the matrix element "3,c" by referring to the table 1204 in a step 1306 for these input image data.

Namely, it is sufficient to read the output of the table 1204 with the value of peripheral dot stored in the register of the processor 1201 as an address.

For example, when it is assumed that white is "0" and black is "1", and the input contents of 25 dots are adopted as "addresses" in the image data of 25 dots which are the contents of the table, a binary number "0000000000001000011000000" becomes an address in the item 1105.

When this method is adopted, however, it is possible to determine the color to be output at a high speed, but bulky storage capacity is required since the address is in 25 bits.

Therefore, a method in which both the input and the output of the table contents 1104 are made to be data in 26 bits stored in the memory, and the values of 25 peripheral dots stored in the register of the processor 1201 and the inputs of the table contents 1104 are compared, and the color is determined by a predetermined "output" corresponding to an accord item is also desirable.

After the color of the output dot is determined and stored in the register in the step 1306, the output dots in the register are output to the image compression/decompression unit 102 in the step 1307.

Next, it is determined in step 1308 whether or not all of the dots have been processed, and, when processing has not been performed with respect to all of the dots, the process is branched to the step 1302, and the processing heretofore described is repeated.

When the processing is completed with respect to all of the dots, the process advances to step 1309, thus terminating compression pre-processing.

As described above, according to the present embodiment, it becomes possible to store a simple program generated in advance in a general purpose processor, to apply transformation processing to an input image based on the program and furthermore, to improve the compression ratio of the data while conforming to compression procedures of the MMR scheme.

The present invention relates to a system for compressing image data, and in particular, it becomes possible to improve data compression ratio while maintaining data exchangeability as it is in a system for executing an MMR compression scheme which is a standard of facsimile.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An image processing unit, comprising:
   image input means for inputting image data and outputting said data as a plurality of white/black dot data composed of a number of dots corresponding to the size of the input image data;
   image pattern detecting means for detecting a predetermined specific image pattern from image data input through said image input means;
   image transforming means for transforming said detected specific image pattern into specific image data by transforming a color of each dot data of a part of said detected specific image pattern into a different dot color in accordance with a predetermined rule;
   image compression means coupled to said image transforming means for compressing said transformed image data in accordance with a a CCITT international standard used in a facsimile unit;
   image decompression means coupled to said image compression means for decompressing said compressed image data in accordance with the CCITT international standard used in a facsimile unit; and
   storage means for storing image data given from either of said image compression means or said image decompression means.

2. An image processing unit according to claim 1, wherein, when said image pattern detecting means detects a certain specific image pattern of image data input through said image input means, said image transforming means determines whether said image pattern is equal to a partial image including predetermined unnecessary dots or not, and eliminating means eliminates said image pattern from said image data when said image pattern is equal to said partial image.

3. An image processing unit, comprising:
   image input means for inputting image data;
   image pattern detecting means for detecting a predetermined specific image pattern from image data input through said image input means;
   image transforming means for transforming said detected specific image pattern into specific image data in accordance with a predetermined rule;
   image compression means coupled to said image transforming means for compressing said transformed image data in accordance with a predetermined compression procedure;
   image decompression means coupled to said image compression means for decompressing said compressed image data in accordance with a predetermined decompression procedure; and
   storage means for storing image data given from said image compression means or said image decompression means,
   wherein, when said image pattern detecting means detects a certain specific image pattern of image data input through said image input means, said image transforming means determines whether said image pattern is equal to a partial image including predetermined unnecessary dots or not, eliminating means eliminates said image pattern from said image data when said image pattern is equal to said partial image, and wherein said partial image is formed as a set of one to four dots having a color different from a monotonous color of dots surrounding said set of dots.

4. An image processing unit, comprising:

image input means for inputting image data;

image pattern detecting means for detecting a predetermined specific image pattern from image data input through said image input means;

image transforming means for transforming said detected specific image pattern into specific image data in accordance with a predetermined rule;

image compression means coupled to said image transforming means for compressing said transformed image data in accordance with a predetermined compression procedure;

image decompression means coupled to said image compression means for decompressing said compressed image data in accordance with a predetermined decompression procedure; and storage means for storing image data given from said image compression means or said image decompression means, wherein, when said image pattern detecting means detects a certain specific image pattern of image data input through said image input means, said image transforming means determines whether said image pattern is equal to a partial image including predetermined unnecessary dots or not, eliminating means eliminates said image pattern from said image data when said image pattern is equal to said partial image, and wherein said partial image is notch data including projection and depression of black dots.

5. An image processing unit, comprising:

image input means for inputting image data;

image pattern detecting means for detecting a predetermined specific image pattern from image data input through said image input means;

image transforming means for transforming said detected specific image pattern into specific image data in accordance with a predetermined rule;

image compression means coupled to said image transforming means for compressing said transformed image data in accordance with a predetermined compression procedure;

image decompression means coupled to said image compression means for decompressing said compressed image data in accordance with a predetermined decompression procedure; and storage means for storing image data given from said image compression means or said image decompression means;

wherein said image transforming means includes:

means for extracting stepwise two black dots or more in a vertical direction and three black dots or less in a horizontal direction from the image data input through said image input means; and means for transforming said stepwise two black dots to one black dot in vertical and horizontal directions.

6. An image processing unit, comprising:

image input means for inputting image data;

image pattern detecting means for detecting a predetermined specific image pattern from image data input through said image input means;

image transforming means for transforming said detected specific image pattern into specific image data in accordance with a predetermined rule;

image compression means coupled to said image transforming means for compressing said transformed image data in accordance with a predetermined compression procedure;

image decompression means coupled to said image compression means for decompressing said compressed image data in accordance with a predetermined decompression procedure; and storage means for storing image data given from said image compression means or said image decompression means;

wherein said image transforming means includes:

means for extracting stepwise one black dot in a vertical direction and stepwise four black dots or more in a horizontal direction from image data inputted through said image input means; and means for transforming said stepwise black dots into stepwise two black dots in a vertical direction.

7. An image processing unit according to claim 6, wherein said image decompression means includes:

means for extracting stepwise two black dots in a vertical direction in the image data applied with decompression processing; and means for transforming said stepwise black dots into a stepwise one black dot.

8. An image processing unit, comprising:

image input means for inputting image data;

image pattern detecting means for detecting a predetermined specific image pattern from image data input through said image input means;

image transforming means for transforming said detected specific image pattern into specific image data in accordance with a predetermined rule;

image compression means coupled to said image transforming means for compressing said transformed image data in accordance with a predetermined compression procedure;

image decompression means coupled to said image compression means for decompressing said compressed image data in accordance with a predetermined decompression procedure; and storage means for storing image data given from said image compression means or said image decompression means;

wherein:

said image transforming means includes means for extracting stepwise three black dots or more in a horizontal direction from image data inputted through said image input means and rotating means for rotating said image data 90 degrees when the number of said stepwise black dots exceeds a predetermined value;

said image compression means compresses said image data rotated by 90 degrees; and said image decompression means decompresses the compressed image data and rotates said decompressed image data 90 degrees in an opposite direction to said 90 degree rotation.

* * * * *